Sept. 4, 1962   J. E. BERRY   3,052,878
ALARM FOR LOGGING SYSTEMS
Filed March 17, 1960   2 Sheets-Sheet 1

United States Patent Office 3,052,878
Patented Sept. 4, 1962

3,052,878
ALARM FOR LOGGING SYSTEMS
James E. Berry, Duncanville, Tex., assignor to Socony Mobil Oil Company, Inc., a corporation of New York
Filed Mar. 17, 1960, Ser. No. 15,724
14 Claims. (Cl. 340—282)

The present invention relates to logging systems wherein a logging tool is moved by way of a cable into and out of a borehole and, more particularly, to an alarm circuit for warning the operator of the approach of the logging tool to the surface of the earth, and has for an object the protection of the logging tool and hoisting mechanism from physical damage as may occur should the operator manually fail to stop the movement of the tool after it has reached the surface of the earth.

In the art of logging wellbores, it is a common practice to log the well as the tool is being moved uphole out of the wellbore. The logging operation is in many instances a long, time-consuming process, and many times the logging of any well takes place during the middle of the night. Accordingly, the operator may fall fast asleep at the critical time that the logging tool is close approaching the surface of the earth. When this occurs, the logging tool is usually pulled by the cable over a supporting sheave mounted high above the floor of the drilling rig and then dashed to the surface of the earth. In accordance with the present invention, damage to a logging tool is obviated, even in the case where the operator may, for one reason or another, become oblivious to the approach of the logging tool. More particularly, provision is made to sense a unique characteristic of the cable for at least audibly announcing, as by way of a sound generator, the approach of the logging tool. Provision is also made in accordance with another aspect of the present invention to de-energize the prime mover or hoisting means should the operator fail to note the audible signal.

More particularly, an alarm system is provided for protection of a logging tool of the type wherein the logging tool is moved in the borehole by way of a supporting cable driven at one end by a hoisting means. The cable in one embodiment has impressed thereon, at a position close to the logging tool, a characteristic or unique signal, preferably a magnetic pulse or marker. Density of cable measurement, electrical capacity change, or radioactive source embedded in the cable can also serve the same purpose. A detector is coupled to the cable for detecting the passage of the unique signal and to generate in response thereto a pulse to which an indicating means responds to announce the approach of the logging tool. Where the hoisting means is driven by an internal combustion engine having an ignition system, the ignition system is also made responsive to the detected signal to interrupt the ignition system of the engine and thereby bring the hoisting means to a stop before the logging tool is pulled over the supporting sheave.

For other objects and attendant advantages of the present invention, reference may now be had to the following detailed description taken in conjunction with the accompanying drawings wherein.

Figure 1:
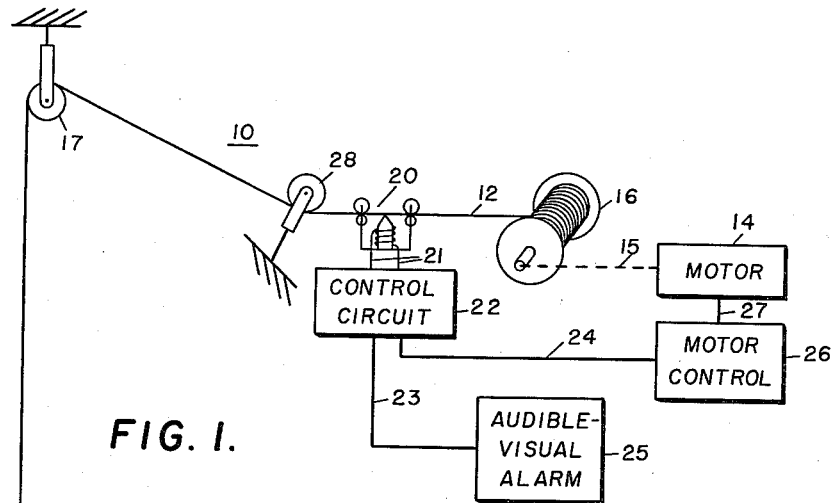
FIG. 1 is a schematic representation of a logging system embodying the present invention.

Referring now to the drawings and more particularly to FIG. 1, there is illustrated a logging system 10 embodying the present invention. A logging tool 11 is supported by a cable 12 for movement in a borehole 13. The movement of the logging tool 11 along the borehole 13 is usually under control of an operator who operates a winch arrangement comprised of a motor 14 mechanically coupled as by way of a shaft 15, illustrated in dotted lines, to a reel 16 about which is wound the cable 12. The cable usually passes over a supporting sheave 17 which in many cases may be supported from structure of a drilling rig, not shown, and, therefore, a substantial distance above the surface of the rig floor and of the earth 18. In accordance with the present invention, the return of the logging tool toward the surface 18 of the earth is sensed by a detector 20 which produces a signal applied by way of conductors 21 to the input of a control circuit 22. The control circuit 22 has two outputs represented by conductors 23 and 24 to which are respectively coupled an audible-visual alarm 25 and a motor control 26. The audible-visual alarm 25 responds to the control pulse from the control circuit 22, applied by way of conductor 23, to sound an alarm to the operator, indicating the near approach of the logging tool 11 to the surface 18 of the earth. An adequate time interval is given for the operator to take over control of the hoisting system and to continue the guidance of the logging tool to the surface of the earth. In the event he is incapable of taking over such control, the motor control 26 responds to the signal from the control circuit 22 to apply to the motor 14 as by way of coupling 27 an effective control to bring the motor 14 to a halt.

It has been the practice and continues to be the practice for logging operations to be carried out at odd hours, conforming with the availability of drilling rig time for logging operations. Likewise, it has been found that logging operations may be carried out in both directions, that is, when going into the well and when coming out of the well. Where the latter condition exists, coupled with the late hours during which the operation takes place, it is possible for the operator to doze off and to otherwise become incapable of stopping the logging tool 11 as it reaches the surface of the earth. As a consequence, the logging tool 11 will be raised over the supporting sheave 17 and dashed to the rig floor or to the surface 18 of the earth with resultant damage to the logging tool.

The accidents of the past will now be avoided by the incorporation of the present invention in logging systems. For, though the operator may fail to respond to the warning emanating from the audible-visual alarm 25, the positive action of the motor control 26 will prevent any damage to the logging tool by stopping automatically the movement of the tool before it reaches the sheave 17.

Any unique form of signal may be incorporated on the cable or, on the other hand, any characteristic of the cable may serve to provide a signal indicative of the position of the well logging tool 11 with respect to the surface of the earth 18. For example, the detecting system 20 may be of the type described in U.S. Patent 2,794,951 of R. A. Broding et al. wherein magnetic impulses previously recorded on the cable are detected for the generation of signal impulses as the cable 12 is moved past the detector 20. On the other hand, the characteristic of the cable may be its length as determined by a measuring sheave 28, employed in a manner hereinafter described in detail, for effecting the operation of the alarm 25 and the motor control 26.

Figure 2:
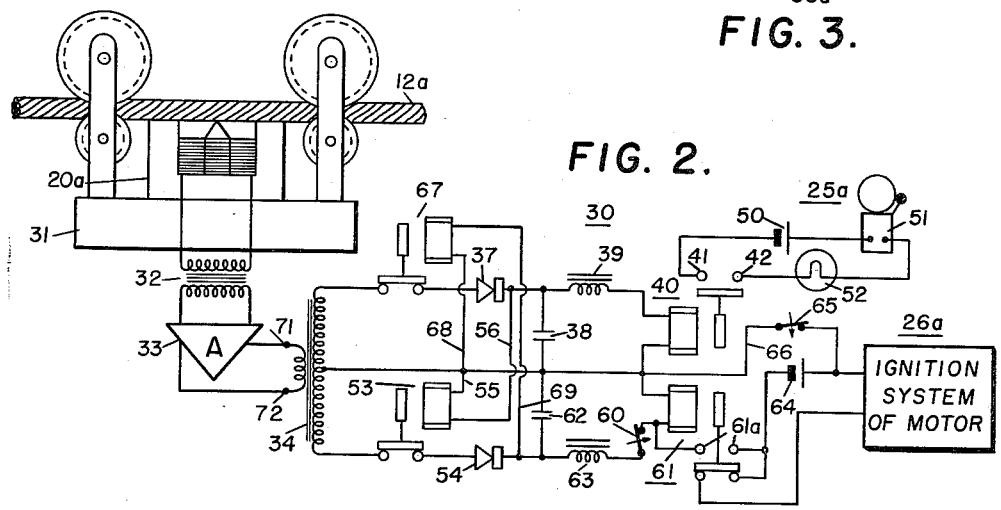
FIG. 2 is an alarm circuit embodying features of the present invention.

Referring now to FIG. 2, there is illustrated a system 30 responsive to unique signals impressed upon the cable for effecting the operation of the audible-visual alarm 25a and the motor control 26a. A detector 20a mounted on a carriage 31 in a manner described in the aforesaid U.S. patent detects magnetic impulses previously recorded on the cable 12a as the tool 11 of FIG. 1 approaches the supporting sheave 17. The detected impulses are applied by way of coupling transformer 32 to an amplifier 33 and thence to transformer 34.

Figure 3:
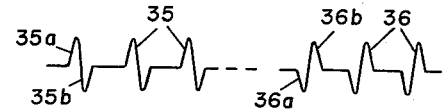
FIG. 3 represents one form of pulse marker suitable for use with the present invention.

The circuit 30 is arranged initially to respond to the signals for the operation of the audible-visual alarm 25a and thereafter to respond to the signals for operation of the motor control 26a. This may be accomplished in several ways. For example, the magnetic impulses or marks impressed upon the cable 12a may take the form of the pulse or markers 35 and 36 of FIG. 3. It will be noted that each pulse 35 includes a positive portion 35a, followed by a negative-going portion 35b. The pulses 36 are characterized by an initial negative-going portion 36a, followed by a positive-going portion 36b. The character of these pulses determines the selective operation of the audible-visual alarm 25a and the motor control 26a, and in the following manner. Assume that the pulses 35 occur first in time as when the logging tool is approaching the surface of the earth. A positive-going signal, representative of the positive-going portion 35a, will be applied to the secondary of the transformer 34. Current will flow through rectifier 37 for duration of the positive-going pulse to charge condenser 38 and to apply a voltage by way of choke 39 to the coil of relay 40. The armature of relay 40 will pick up and close contacts 41 and 42 to complete the audible-visual alarm circuit 25a. More particularly, current provided by a battery 50 will flow through bell 51 and lamp 52 and thence through closed contacts 41 and 42 to the other side of battery 50. The audible alarm will continue to operate for the duration of the pulses 35 or, as described hereinafter, until the operator disables the circuit.

The motor control 26a is made nonresponsive to the pulses 35 by opening that portion of the secondary of transformer 34 associated with relay 61. More particularly, relay 53 responds to the first positive-going pulse corresponding with the pulse 35a to pick up its armature and to open the circuit to rectifier 54. The relay coil of relay 53 is connected in circuit across the condenser 38 by way of conductors 55 and 56.

The operator's attention should now be called to the fact that the logging tool is nearing the surface, at which time he may open the motor control circuit by manually opening switch 60 to prevent response of the motor control 26a to pulses 36. He then may continue to observe the approach of the logging tool to the surface and bring it to a stop at an appropriate distance from the sheave 17. On the other hand, if for some reason the operator is unable to respond to the operation of the audible-visual alarm 25a, the first negative-going portion of a pulse corresponding to pulse 36a will be applied to the secondary of transformer 34 to operate relay 61 and immediately de-energize the ignition circuit of the motor. The negative-going pulse is applied by way of rectifier 54 through the now closed contacts associated with relay 53 to begin charging condenser 62 and apply a voltage by way of choke 63 to the coil of relay 61. The armature of relay 61 will pick up to interrupt the flow of current from battery 64 and thus disable the ignition system of the motor and bring the tool to a stop. The relay 61 is maintained energized by way of a circuit, including back contacts 61a, battery 64, switch 65, and conductor 66. The motor will remain de-energized until such time as the operator opens the switch 65 to de-energize the relay 61 and again complete an ignition circuit for the motor.

The relay 67 prevents the alarm circuit 25a from responding to the positive pulses 36b associated with pulses 36. As soon as current begins to flow through rectifier 54, the relay coil of relay 67, connected across condenser 62 by way of conductors 68 and 69, is energized to open the contacts associated with the armature of relay 67 and interrupt the transformer secondary circuit which includes the rectifier 37.

Figure 5:
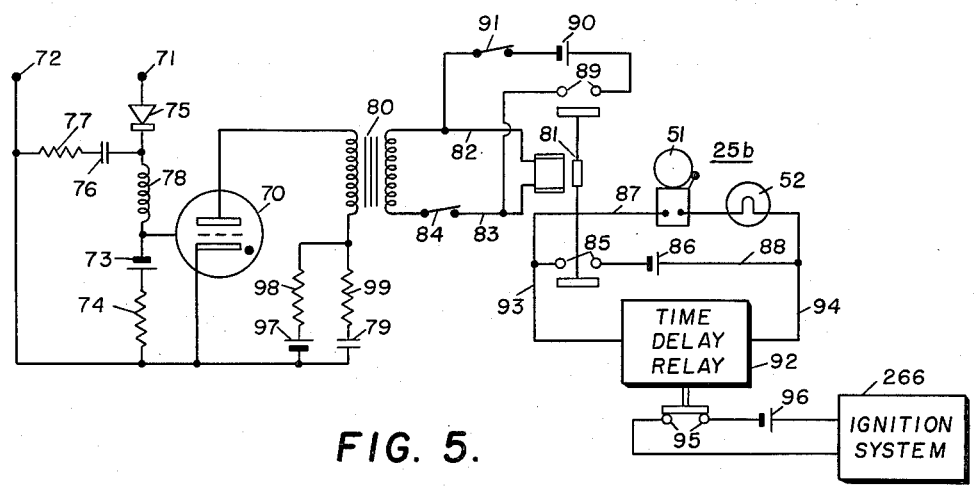
FIG. 5 illustrates yet another alarm system suitable for use with the present invention.

The system of FIG. 2 is applicable for use with those cables normally marked with magnetic markers employed in some systems for indicating the depth of a logging tool. In order to prevent the system of FIG. 2 from operating each time a cable marker pip passes the detector 20a, relays 40 and 61 are made responsive only to the occurrence of a sequence of positive or negative pulses appearing over a short time interval. More particularly, before either of the relays 40 or 61 will respond, it will be necessary to charge, respectively, condensers 38 and 62 to provide sufficient voltage for the operation of these relays.

Where the magnetic marker system is not employed for depth measurement, an alternative arrangement may be employed wherein the system will respond to single pulses, and, in fact, one in which it will be unnecessary to impress signals of different characteristic for the selective operation of the alarm and of the motor control. Such a circuit is illustrated in FIG. 5 wherein a switching device 70, such, for example, as a grid controlled, gaseous element known in the art as a "Thyratron," is triggered in response to a pulse applied from the output of amplifier 33, FIG. 2, directly to input terminals 71 and 72. The input terminals 71 and 72 are also illustrated in FIG. 2 in the output circuit of the amplifier 33. The switch 70 is normally held at cutoff by way of a negative bias provided by battery 73 having one end connected to the grid of the switch 70 and an opposite end connected by way of resistor 74 to the cathode. The generation of a positive-going pulse in the output of the amplifier 33, FIG. 2, is applied to the terminals 71, 72 and passes through rectifier 75 and inductor 78, and is adequate to overcome the negative bias and to cause conduction of the switch or tube 70. Current flowing from the previously charged capacitor 79 produces a pulse in the output transformer 80 which is effective to energize the coil of relay 81 initially to operate the audible-visual alarm 25b. More particularly, the voltage is applied from the transformer 80 to the coil of relay 81 by way of a circuit including conductor 82, the coil of the relay 81, conductor 83, and switch 84 to an opposite end of the secondary of the transformer 80. Upon energization of the relay 81, its armature will pick up to close contacts 85 and complete a circuit from one side of battery 86 by way of closed contacts 85, conductor 87, bell 51, lamp 52, and conductor 88 to the other side of the battery 86.

The alarm will now give evidence to the operator that the logging tool 11 is close approaching the surface of the earth. The alarm will continue to function until disabled by the operator. More particularly, the relay 81 is held in an energized condition by closure of back contact 89 which complete a circuit for applying a voltage from battery 90 by way of closed switch 91 across the operating coil of relay 81. This circuit may be interrupted to de-energize the alarm circuit by opening switch 91. Should the operator fail to de-energize the relay 81 for one reason or another, the ignition system or motor control 26b will be effected to halt the hoisting of the tool after a time interval determined by the characteristics of a time delay relay 92 connected by way of conductors 93 and 94 across battery 86. With the operation of relay 92, contacts 95 will be opened to interrupt the flow of current from battery 96 and thus disable the ignition system and bring the hoisting apparatus to a halt.

The embodiment of FIG. 5 is effective to protect the logging tool under all conditions and will respond to either a single impulse or may respond only to a series of impulses as determined by the desired operation. For example, the input to the switch 70 may include capacitor 76 and resistor 77 as an integrating circuit where it is desired to respond to a series of impulses under those conditions where the hoisting cable has been impressed with spaced magnetic markers for depth measurement. On the other hand, the condenser 76 may be eliminated where the system is to respond to a single large impulse impressed on the cable.

In order to avoid the shutting down of the system as the tool is being lowered in the borehole, the operator initially will open switch 84 to render the relay 81 non-responsive to impulses transmitted by way of transformer 80. Although the switch 70 may operate in response to a detected pulse as the logging tool is lowered into the well, the alarm and motor control will remain unaffected. Adequate time thereafter will be available for the recharging of condenser 79 from battery 97 by way of resistors 98 and 99.

Figure 4:
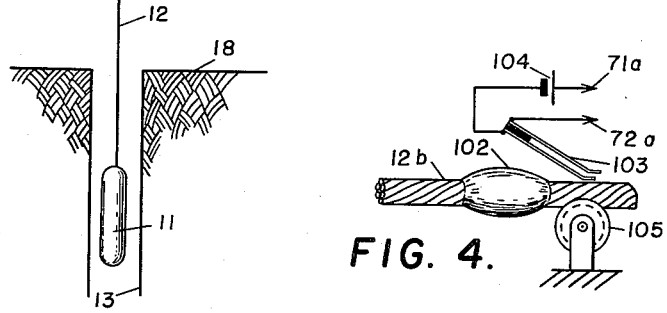
FIG. 4 illustrates another form of unique signal on the cable in the form of a physical deformation thereof.

Now that several embodiments of the invention have been disclosed, it will become apparent to those skilled in the art that other characteristics of the cable may be employed for the actuation of an alarm and a motor control circuit. For example, cable 12, FIG. 4, may be physically deformed as by the provision of an enlarged portion 102 which is effective when passing over supporting sheave 105 to close switch 103. The closure of switch 103 applies the output of battery 104 to the input of the control circuit of FIG. 5 by way of contacts 71a, 72a, corresponding with contacts 71, 72, to trigger switch 70.

Figure 6:
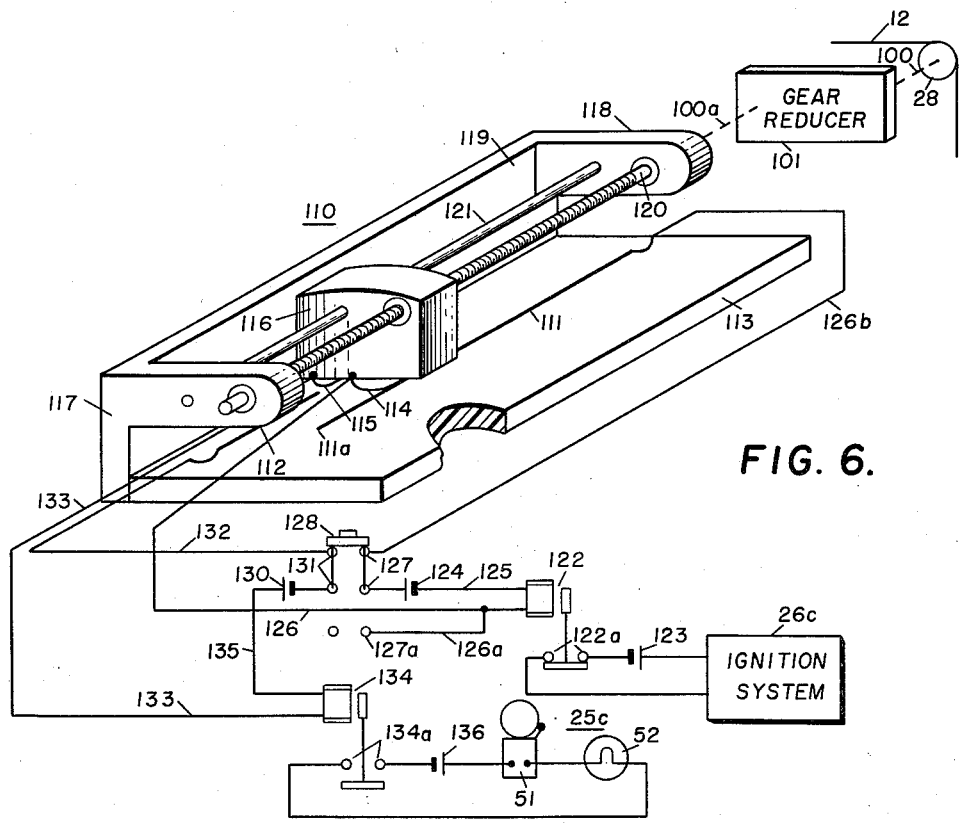
FIG. 6 illustrates yet another alarm system wherein the unique cable characteristic sensed by the system is the cable length.

Another characteristic employed may be the length of the cable, as illustrated in the embodiment of FIG. 6, wherein the output of the measuring sheave 28, in response to movement of the cable 12, is applied by way of shaft 100 to a gear reducer 101. The output of the gear reducer is made effective to actuate a switching arrangement 110 calibrated with respect to the length of cable moved over the measuring sheave 28 and indicative of the position of the logging tool with respect to the surface of the earth. The switching arrangement 110 comprises a pair of contacts 111 and 112 in the form of conductive strips formed in a base 113 of insulating material. Associated with the contacts 111 and 112, respectively, are sliding contacts 114 and 115 mounted on a traveling nut type assembly 116 adapted for movement from one end 117 toward an opposite end 118 of a supporting structure 199. The alarm 25c is sounded when contact 115 engages contact 112 and the motor control or ignition system 26c is effected to interupt the hoisting or movement of the logging tool when contact 114 moves beyond the end 111a of contact 111.

Assuming now that the tool is being raised toward the surface of the earth, movement of the cable 12 will be translated by way of gear reducer 101 and its output shaft 100a to rotation of a threaded shaft 120 extending between the ends 117, 118 of the supporting structure 119 to effect movement of the assembly 116 along guide rail 121. The engagement of contacts 111 and 114 completes a circuit for the energization of relay 122 for application of current from battery 123 to the ignition system 26c by way of closed relay contacts 122a. The energization circuit may be traced from one side of battery 124, conductor 125, the operating coil of relay 122, conductor 126, contact 114, contact 111, conductor 126b, and contacts 127 of a double-pole, double-throw switch 128 to the opposite side of the battery 124.

When the contact 115, mounted on the assembly 116, engages contact 112, the alarm 25c will be energized to indicate that the logging tool is approaching the surface of the earth. The energization circuit for the alarm 25c may be traced from one side of battery 130, contacts 131 of switch 128, conductor 132, contact 112, contact 115, conductor 133, and the operating coil of relay 134 and conductor 135 to the opposite side of battery 130. The energization of relay 134 effects the closure of contacts 134a to apply the output of battery 136 to bell 51 and lamp 52.

When the operator hears the alarm provided by the bell 51 or sees the illuminated lamp 52, he will disable the alarm by interrupting the circuit, including the bell and lamp. This may be accomplished any number of ways; for example, the double-pole, double-throw switch 128 may be moved from its illustrated position to a position wherein contacts 127 and 127a are closed. The movement of the switch 128 interrupts the energization circuit for the operating coil of relay 134 immediately to shut down the audible-visual alarm, and at the same time completes, by way of contacts 127 and 127a, an energizing circuit for the relay 122 in order to maintain closed the contacts 122a for the continued energization of the ignition system.

Should the operator fail to hear the audible alarm, the hoisting means for the logging tool automatically will come to a halt as the contact 114 moves beyond the end 111a of contact 111. The interruption of contacts 111 and 114 deenergizes the relay 122 by opening the circuit from battery 124, thereby to drop the relay armature and open contacts 122a. The ignition system immediately is de-energized and the logging tool safely is brought to a halt.

Another advantage of the embodiment of FIG. 6 resides in its fail-safe features. More particularly, it is to be noted that the control for the ignition system depends upon the energization of relay 122. Therefore, should the relay become de-energized for any reason, the hoisting of the logging tool will be stopped immediately. This is to be contrasted with an arrangement wherein the relay 122 normally is in a de-energized state and the control of the hoisting device is dependent upon the completion of a circuit and the application of energy to operate the relay. The advantages of fail-safe operation are obvious.

While the audible-visual alarm circuit 25c is illustrated in FIG. 6 to be controlled by a circuit that is not necessarily fail safe, it is understood that a fail-safe arrangement similar to that employed with the ignition system may be provided for the audible-visual alarm. However, it is to be further observed that the invention is applicable for the protection of the logging tool independent of whether either circuit is fail safe.

The calibration of the system of FIG. 6 may be accomplished by manually positioning the block 116 such that contact 114 just engages the end 111a of contact 111 as the logging tool is started into the borehole. The ignition system 26c may be made effective during this adjustment by movement of the knife blade of double-pole, double-throw switch 128 to a position to close contacts 127 and 127a directly to apply the output of battery 124 to the operating coil of relay 122 by way of conductors 125 and 126a. With the block 116 properly positioned and the switching arrangement 110 thus calibrated, the double-pole, double-throw switch may be returned to its illustrated position for continued operation of the logging system with the knowledge that upon the return of the logging tool toward the surface, damage to the tool will be obviated even in the event that the hoisting system is left unattended.

From the above disclosure, it will now be apparent to those skilled in the art that the present invention is also applicable to the protection of the logging tool as it is being lowered into the wellbore. More particularly, the present invention is equally effective for preventing the logging tool from hitting the bottom of the hole and piling excess cable into the hole with consequent damage to the tool.

Now that several embodiments of the invention have been disclosed, yet other embodiments will make themselves known to those skilled in the art and it is intended to cover such embodiments as fall within the scope of the appended claims.

What is claimed is:

1. A safety system for a well logging arrangement to protect the well logging tool from physical damage as it comes out of a borehole comprising a cable connected at one end to a logging tool for supporting the logging tool for movement in the borehole, a circuit for indicating the near approach of the logging tool to the surface of the earth, and means coupled to said cable intermediate the ends thereof and responsive to a condition of said cable for rendering said indicating circuit operative to prevent damage to the logging tool.

2. A safety system for a well logging arrangement wherein a logging tool is supported by a cable for movement within a borehole and wherein said cable passes over a sheave supported above the surface of the earth, comprising a unique signal impressed upon said cable proximate to the well logging tool, means coupled to said cable for detecting said unique signal, means coupled to said detector and responsive to said signal for producing a control signal, and indicating means responsive to said control signal for indicating the approach of the well logging tool to the surface of the earth.

3. The safety system of claim 2 wherein said cable is physically deformed to provide said unique signal and wherein means are provided for sensing said physical deformation to produce said control signal.

4. The safety system of claim 2 wherein said unique signal is provided by at least one magnetic impulse impressed upon said cable and wherein said detector is a magnetic sensing device for generating an electrical impulse upon movement of the magnetized portion of cable past said detector.

5. The system of claim 4 wherein said cable is driven by hoisting means including an internal combustion device having an ignition system and wherein means are provided to interrupt said ignition system to provide an indication of the approach of the logging tool to the surface of the earth.

6. The system of claim 4 wherein said indicator comprises an audible generator to sound the approach of the logging tool to the surface of the earth.

7. The system of claim 4 wherein said cable is driven by a prime mover including an electrical circuit and wherein there is provided an audible signal generator, means responsive to the unique signal on said cable for first energizing said audible signal generator to announce the approach of the logging tool toward the surface of the earth and then to disable said prime mover to stop said logging tool.

8. A safety system for a well logging arrangement wherein a logging tool is supported by a cable for movement in a borehole and wherein said cable passes over a sheave supported above the upper end of the borehole, comprising a unique signal impressed upon said cable proximate to the logging tool and including a plurality of magnetic pulses closely spaced along the length of the cable, means coupled to said cable for detecting said magnetic pulses for producing electrical signals, means coupled to said detector and responsive to said electrical signals for producing a control signal, and indicating means responsive to said control signal for indicating approach of the well logging tool to the upper end of the borehole.

9. The safety system of claim 8 wherein said means coupled to said detector includes an integrating circuit whose time constant is long compared with the rate of occurrence of said pulses as said cable is moved past said detector.

10. A safety system for a well logging arrangement of the type wherein a logging tool is coupled to a driving means by a cable for movement along the length of a borehole and wherein the cable passes over a sheave supported above the upper end of the bore hole, comprising an audible alarm and means for disabling the movement of the logging tool a time interval after said audible alarm has been energized, a first means responsive to the movement of the cable for generating a function, a second means for maintaining in an energized state the driving system for the logging tool, and a third means responsive to said function as said logging tool approaches the upper end of the borehole for closing an energizing circuit to initiate operation of said audible alarm, said second means responsive to said function for disabling the cable driving means after the logging tool has moved a predetermined distance further toward the upper end of the borehole.

11. A safety system for a well logging arrangement to protect a well logging tool from physical damage as it is moved in a borehole, comprising a cable connected at one end to a logging tool for supporting the logging tool for movement in the borehole, a circuit for indicating the near approach of the logging tool to an end of the borehole, and means coupled to said cable intermediate the ends thereof and responsive to a condition of said cable indicative of a physical state of the logging tool within the wellbore for rendering said indicating circuit operative to prevent damage to the logging tool.

12. A safety system for a well logging arrangement wherein a logging tool is supported by a cable for movement in a borehole and wherein said cable passes over a sheave supported above the upper end of the borehole, comprising power means for driving said cable, an audible alarm, signals of a first and second nature spaced along the length of said cable, a detector coupled to said cable for detecting said signals upon movement of said cable past said detector, and means coupled to said detector and interconnected with said alarm and said power means, said means being responsive to said signals of a first nature for operating said alarm and then responsive to said signals of a second nature for disabling said power means thereby stopping the movement of said cable.

13. The system of claim 12 wherein said signals of a first and second nature include magnetic pulses impressed on said cable and closely spaced along the length of said cable.

14. The system of claim 13 wherein said signals of a first and second nature are of opposite polarity.

References Cited in the file of this patent

UNITED STATES PATENTS

| | | |
|---|---|---|
| 2,473,468 | Cooley | June 14, 1949 |
| 2,513,812 | McClay | July 4, 1950 |
| 2,581,721 | Sherwood | Jan. 8, 1952 |
| 2,634,405 | Van Stone et al. | Apr. 7, 1953 |
| 2,683,779 | Dishman | July 13, 1954 |

FOREIGN PATENTS

| | | |
|---|---|---|
| 505,558 | Germany | Aug. 21, 1930 |
| 934,822 | Germany | Nov. 3, 1955 |